United States Patent [19]

Ueda et al.

[11] Patent Number: 5,305,158
[45] Date of Patent: Apr. 19, 1994

[54] POSITIONING CONTROL APPARATUS

[75] Inventors: Takaharu Ueda; Shigeki Mizuno; Tetsu Yamamoto, all of Amagasaki, Japan

[73] Assignee: Mitsubishi Denki Kabushiki Kaisha, Tokyo, Japan

[21] Appl. No.: 707,812

[22] Filed: May 30, 1991

[30] Foreign Application Priority Data

Jun. 4, 1990 [JP] Japan .................. 2-146998

[51] Int. Cl.$^5$ .............. G11B 21/02; G05D 23/275
[52] U.S. Cl. ..................... 360/75; 318/560; 318/561; 360/77.02; 360/77.05
[58] Field of Search .............. 360/75, 77.01, 77.02, 360/77.03, 77.04, 77.05, 77.06, 77.07, 77.08, 77.12, 78.04; 318/560, 561, 621, 638, 632

[56] References Cited

U.S. PATENT DOCUMENTS

| | | | |
|---|---|---|---|
| 4,742,285 | 5/1988 | Sasaki et al. | 318/632 |
| 4,796,112 | 1/1989 | Mizukami | 360/78.07 |
| 4,833,551 | 5/1989 | Song | 360/77.05 |
| 4,940,924 | 7/1991 | Mizuno et al. | 318/560 |
| 4,947,093 | 8/1990 | Dunstan et al. | 360/73.03 |

Primary Examiner—William L. Sikes
Assistant Examiner—Toan Tran
Attorney, Agent, or Firm—Rothwell, Figg, Ernst & Kurz

[57] ABSTRACT

A positioning control apparatus comprises a feedback compensatory system and a feedforward compensatory system. The feedforward compensatory system comprises a detector for detecting a position of a controlled object whose position is to be controlled, and a compensator connected to the detector. The feedforward compensatory system comprises a first filter having a characteristics reverse to that of the feedback compensatory system, and a second filter having a characteristics reverse to that of the object. A desired drive signal generator supplies the feedforward compensatory system with a desired drive signal having a frequency spectrum having a minimum at the mechanical resonance frequency of the object.

5 Claims, 8 Drawing Sheets

POSITIONING CONTROL APPARATUS

FIELD OF THE INVENTION

The present invention relates to a positioning control apparatus, and in particular to an apparatus which can rapidly brings an object to a desired position, and then keep the object at the desired position with a high accuracy, and with minimum oscillation after the object is brought to the desired position. Such positioning is often required in a disk drive, e.g., a magnetic disk drive, for continued seek and track-following operations.

BACKGROUND OF THE INVENTION

When it is desired to move a magnetic head from a certain track to a desired track, velocity control is performed until the desired track is reached, and then the control is switched to track-following control. During the velocity control, the head is initially accelerated, and then decelerated. The acceleration is for minimizing the time for the head to reach the desired track. The deceleration is in preparation for the transition to the track-following control.

Figure 10:
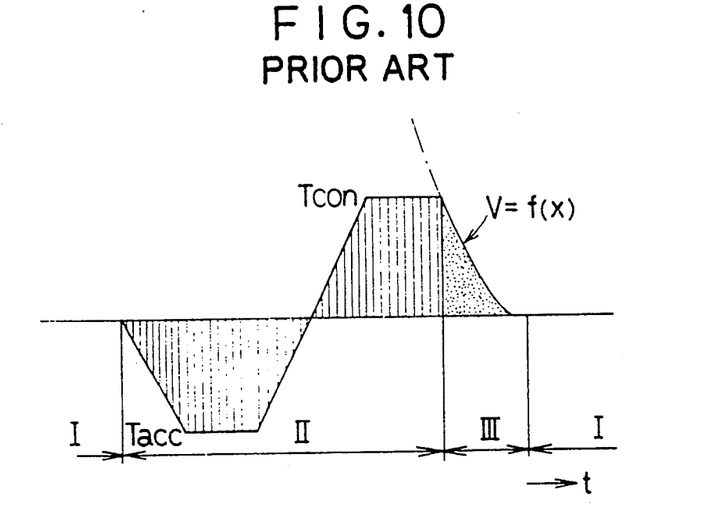
FIG. 10 is a diagram showing the waveform of the drive signal in the apparatus of FIG. 9.

When the head is driven by an electric actuator, e.g., an electric motor, of a certain type the acceleration is proportional to the drive current supplied to the actuator. The drive signal is made positive for acceleration, and is then made negative for deceleration. In order to avoid drastic change in the acceleration, a drive signal of trapezoidal waveform is often used. An example of trapezoidal signal is shown in FIG. 10. In FIG. 10, the downward swing of the drive signal represents acceleration, and the upward swing represents deceleration.

In the apparatus disclosed in Japanese Patent Kokai Publication No. 125,411/1987 (of which U.S. Pat. No. 4,796,112 issued Jan. 3, 1989 is a counterpart), the trapezoidal waveform signal is applied during the period II. In the subsequent period III, which starts at a time a little before the deceleration period ends, a velocity-following control is performed in which a signal with a deceleration reference velocity profile $V=f(x)$ is used as a reference. In the subsequent period I, which starts when this signal falls to zero, the track-following control is performed.

Figure 9:
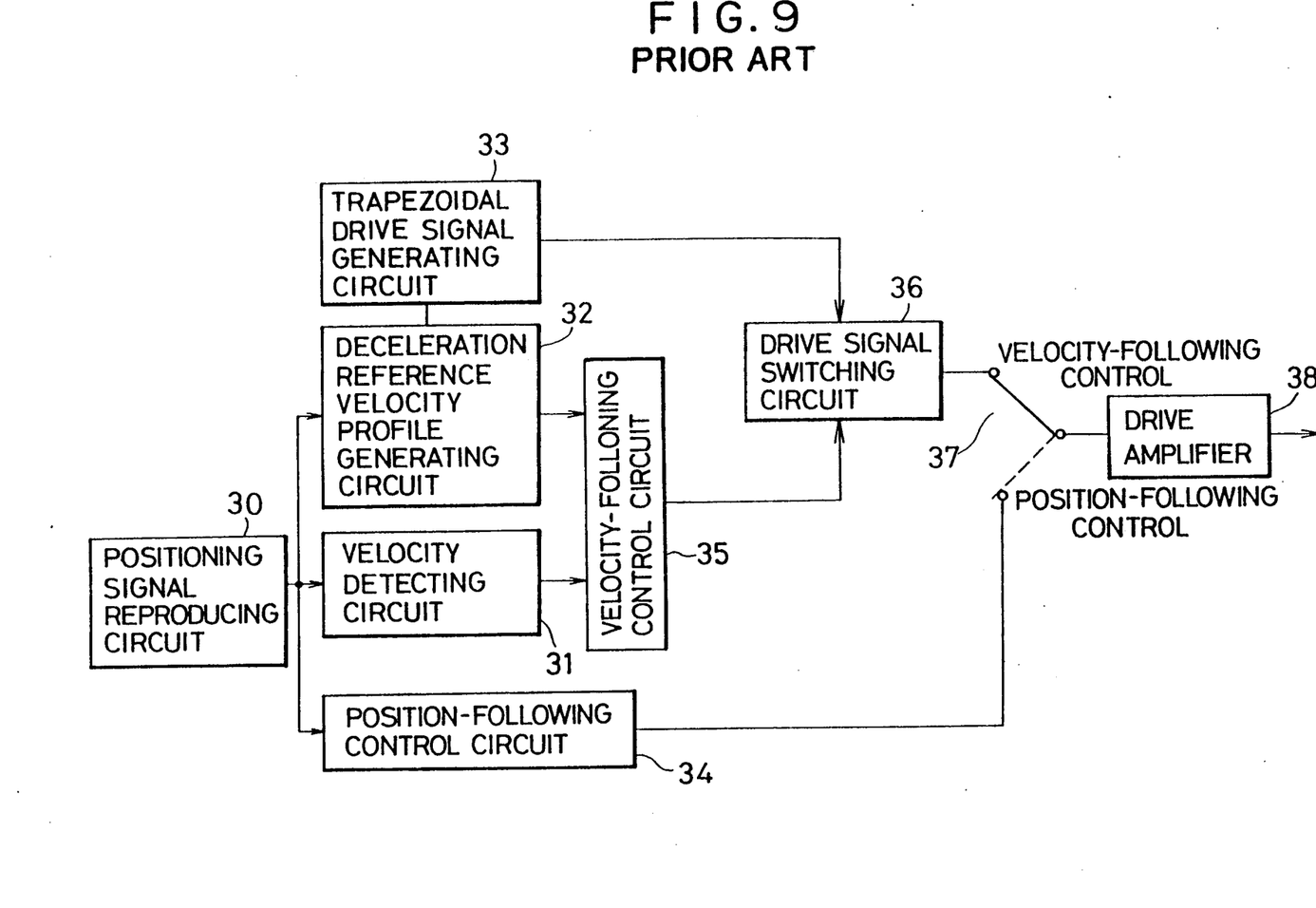
FIG. 9 is a block diagram showing a conventional positioning control apparatus.

For implementing the above described sequence of different modes of control, the above publication shows use of an apparatus shown in FIG. 9.

During period III, the signal of the trapezoidal waveform is applied from a trapezoidal drive signal generating circuit 33 is selected by a drive signal generating circuit 36, and is passed through a switch 37, to be applied to a drive amplifier 38. During period II, the signal from a deceleration reference velocity profile generating circuit 32 and a signal from a velocity detecting circuit 31 are applied to a velocity-following control circuit 35, whose output is selected by the drive signal switching circuit 36, and is passed through the switch 37, thereby to be applied to the drive amplifier 38. In the period I, the output of a position control circuit 34 is passed through the switch 37, to be applied to the drive amplifier 38.

The transition from the period II to the period III occurs when the output of the velocity-following control circuit 35 is exceeded by the output of the trapezoidal drive signal generating circuit 33. The drive signal switching circuit 36 detects this and changes its selection from the output of the trapezoidal drive signal generating circuit 33 to the output of the velocity-following control circuit 35. The transition from the period III to the period I occurs when a position detector, not shown detects the arrival of the magnetic head at or near the desired track. The switch 37 is controlled by such a position detector and is turned from the position indicated by the solid line (selecting the output of the drive signal switching circuit 36) to the position indicated by the broken line (selecting the output of the position-following control circuit 34).

Moreover, the above-noted Japanese publication teaches that the ratio of the period of constant acceleration, Tcon, (upper side of the trapezoid) to the total period of the acceleration and deceleration, Tacc, is set to be 0.1 to 0.3 to restrain the driving force component of the mechanical resonance component of the positioning mechanism. This is so set in an attempt to improve the accuracy of the positioning control.

The prior art positioning control apparatus is configured as described above, and it is therefore associated with the following problems:

(1) The control is switched between three modes. At the time of switching, a transient response takes place because of discontinuity in the velocity and the position. This results in a longer positioning time.

(2) The time at which the switching is made is determined experimentally through computer simulation. The design of the apparatus is therefore difficult.

(3) Because three types of signals are produced for three modes of control and they must be switched, the apparatus is complex.

SUMMARY OF THE INVENTION

An object of the invention is to provide a positioning control system which can be implemented with a simple configuration, in which residual oscillation after the positioning is suppressed, and which has a high-speed response and a high positioning accuracy.

A positioning control apparatus according to the invention comprises a feedback compensatory system and a feedforward compensatory system. The feedforward compensatory system comprises a detector for detecting a position of a controlled object whose position is to be controlled, and a compensator connected to the detector. The feedforward compensatory system comprises a first filter having a characteristics reverse to that of the feedback compensatory system, and a second filter having a characteristics reverse to that of the object. A desired drive signal generator supplies the feedforward compensatory system with a desired drive signal having a frequency spectrum having a minimum at the mechanical resonance frequency of the object.

According to the invention, the spectrum component of a desired drive signal is at the minimum at the peak frequencies of the mechanical resonance of the positioning mechanism which constitutes the controlled variable. Residual oscillation of the positioning due to the mechanical resonance of the positioning mechanism can therefore be suppressed. Accordingly, positioning control can be made with a high speed and a high accuracy.

DETAILED DESCRIPTION OF THE PREFERRED EMBODIMENTS

An embodiment of the invention will now be described with reference to the drawings.

Figure 1:
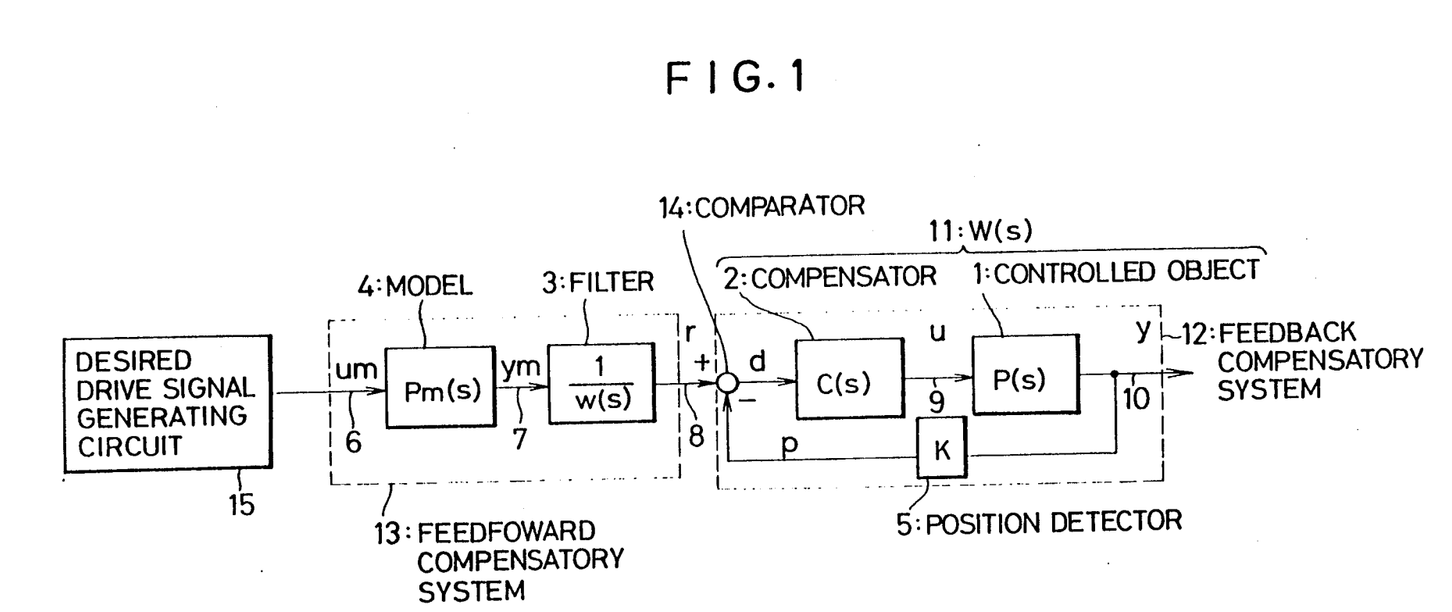
FIG. 1 is a block diagram showing a positioning control apparatus of an embodiment of the invention.

FIG. 1 shows a configuration of a positioning control apparatus of an embodiment of the invention.

In the figure, a positioning mechanism 1 which constitutes a controlled object, i.e., the object to be controlled by the control apparatus. The transfer function of the controlled object is represented by P(s).

The control apparatus comprises a compensator 2 for stabilizing the feedback system. Its transfer function is represented by C(s). The compensator 2 applies a drive signal, or a manipulated variable, u to the controlled object 1.

The control apparatus further comprises a position detector 5 having a gain K. It couples the controlled object 1 with the compensator 2, through a comparator 14. That is, it detects the position of the controlled object 1, i.e., the controlled variable y, and produces a position signal p and applies it to the comparator 14, whose output, which is a controlled deviation d is applied to the compensator 2.

The position detector 3, the compensator 2 and the comparator 14 form a feedback compensatory system 12.

Another input to the comparator 14 is an input signal r over a signal line 8 to the feedback compensatory system 12.

The transfer function from the line 8 to the point 10 where the controlled variable y appears is denoted by W(s).

The input signal r to the feedback compensatory system 12 is supplied from a feedforward compensatory system 13, which comprises a filters 3 and 4 cascaded with each other.

The filter 3 has a transfer function 1/W(s), which is an inverse of the transfer function W(s) of the combination of the compensator 2 and the controlled object 1.

The filter 4 has a dynamic characteristics of the controlled object 1, i.e., it is a model Pm(s) of the transfer function of the controlled object 1.

A desired drive signal generating unit 15 supplies a desired drive signal um over a signal line 6 to the filter 4. The output of the filter 4 is a desired output (desired position) ym.

The output ym of the filter 4, i.e., the desired position, is applied over a signal line 7 to the filter 3.

The overall transfer function of the signal path from the desired output ym on the line 7 to the controlled variable y at 10, i.e., through the filter 3, the comparator 14, the compensator 2 and the controlled object 1 is "1" (unity), so the desired position ym has an identical value with the actual position y, which is the controlled variable. As a result, the desired drive signal um over the signal line 6 and the drive signal u over the signal line 9 will be identical to each other, on condition that the model Pm(s) is identical to the controlled object.

The drive signal supplied to the filter 4 has such a spectrum whose component is minimum at the peak frequencies of the mechanical resonance of the positioning mechanism. This is in order to suppress the residual oscillation after the positioning due to the mechanical resonance of the positioning mechanism (controlled object) 1.

An actual design example is taken for further explanation. The controlled object 1 in this example is a movable member integrated with a motor and having a mechanical resonance Gm(s). The inertia mass of the controlled object 1 is normalized and is assumed to be 1. The gain K of the position detector 5 is also assumed to be 1. The transfer function of the controlled object 1 is given by the following relationship:

$$P(s) = 1/s^2 \cdot Gm(s)$$

Figure 2:
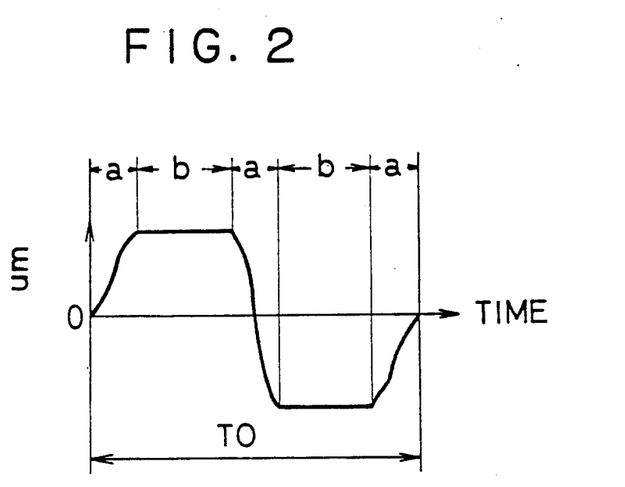
FIG. 2 is a diagram showing the waveform of the drive signal used in the control system.

The desired drive signal um used in this control system is shown in FIG. 2.

Figure 3:
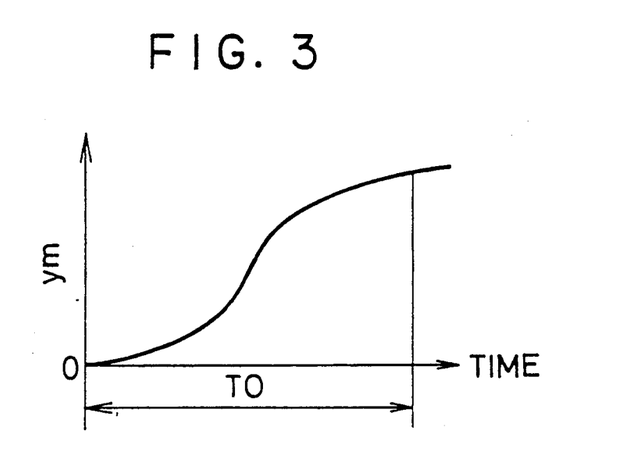
FIG. 3 is a diagram showing the variation of the desired position with respect to time.

The second-order integral function of the drive signal um is shown in FIG. 3. It stands for the output signal (position) ym.

The drive signal um is formed of a quadratic function and a linear function, and so determined that its second-order integral function rises smoothly over the positioning period TO.

If the gain of the mechanical resonance Gm(s) of the controlled object were sufficiently small or its frequency were sufficiently high, the position ym would vary along a curve shown in FIG. 3. But mechanical resonance Gm(s) is present in actual controlled object. In order to prevent the residual oscillation in the positioning (e.g., immediately after the seek operation), the shape of drive signal um must be so determined as to prevent the excitation.

Figure 4:
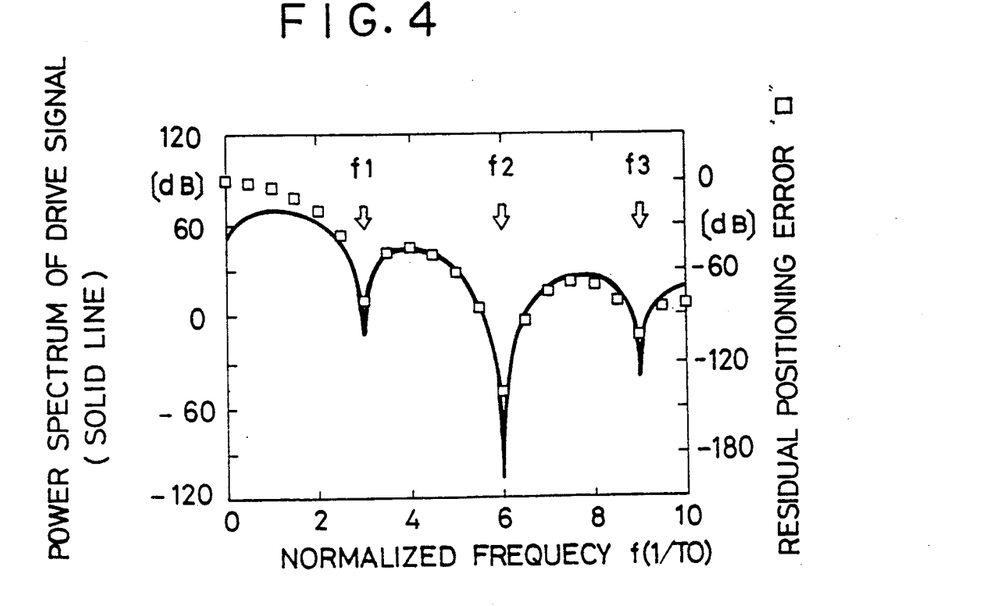
FIG. 4 is a diagram showing the the spectrum component of the drive signal and the positioning error due to the positioning oscillation.

FIG. 4 shows the relationship between the spectrum of the manipulated variable um and the residual oscillation of the positioning control system having mechanical resonance. The illustrated relation is obtained through computer simulation. The solid line shows the power spectrum of the drive signal when the shape parameter a of um (see FIG. 2) is selected to be ¼ of the positioning time (e.g., seek time) TO.

The marks "□" at the respective frequencies show the magnitudes of the residual oscillation which would occur if a mechanical resonance having a peak of 30 dB at the corresponding frequency were present and the positioning control were performed with this manipulated variable um. The magnitude of the residual oscillation is represented by the residual positioning error, i.e., the ratio of the positioning to the steady-state value, while the horizontal axis represents the frequency normalized by 1/TO.

Figure 5:
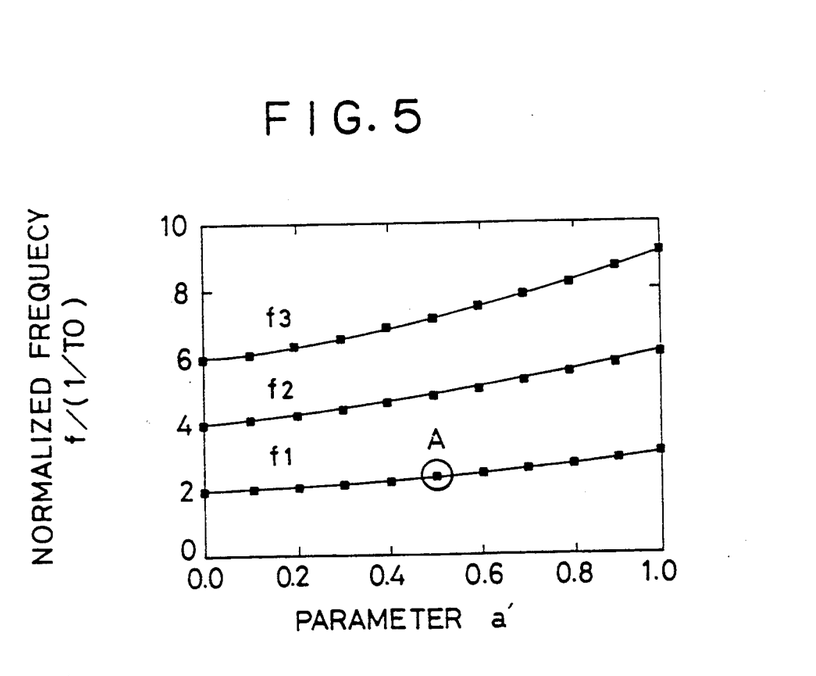
FIG. 5 is a diagram showing the frequencies at which the spectrum of the drive signal assumes minima and the shape parameter of the drive waveform.

It will be seen from the figure that if the mechanical resonance frequency coincides with the frequencies fi (i=1, 2, 3) at which the spectrum gain assumes a minimum, it is difficult to excite the resonance and the residual oscillation is small. In order to avoid excitation of a mechanical resonance, the relationship between the shape parameter a' shown in FIG. 5 (a'=a/(TO/3), i.e., a normalized value of a with respect to TO/3) can be utilized and a' is determined so that the resonant frequencies coincide with fi.

The effects of the above concept will be demonstrated by reference to actual design examples.

Figure 6A:
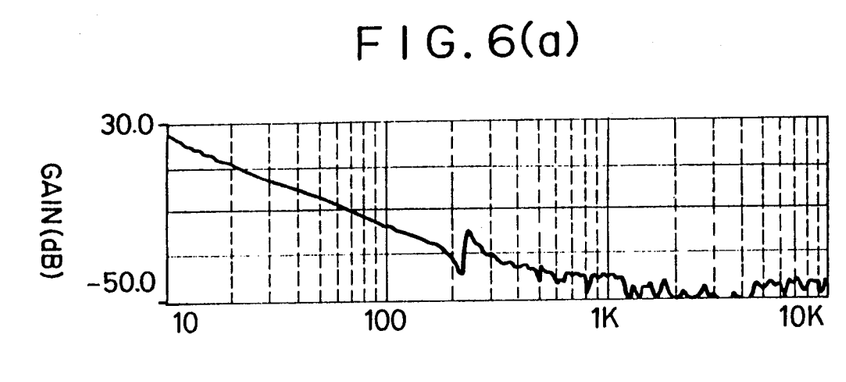
FIG. 6(a) and FIG. 6(b) are diagrams showing the transfer functions of the controlled object (positioning mechanism) controlled by the control apparatus of the invention.
Figure 6B:
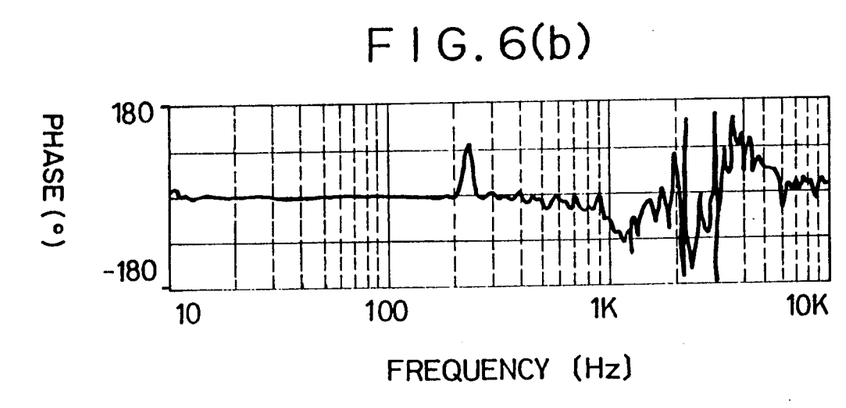
Figure 7A:
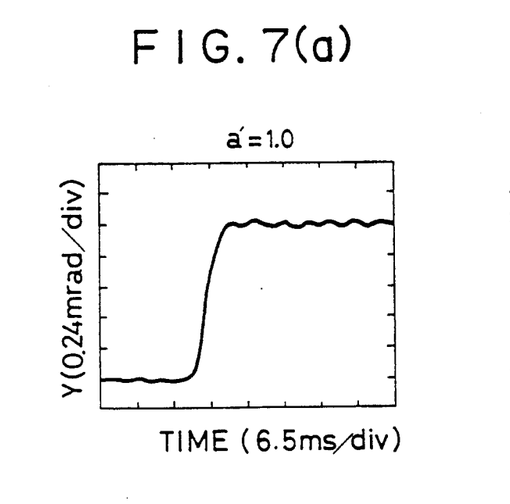
FIG. 7(a) to FIG. 7(d) are diagrams showing the result of the positioning by the positioning control apparatus of the embodiment of the invention.
Figure 7B:
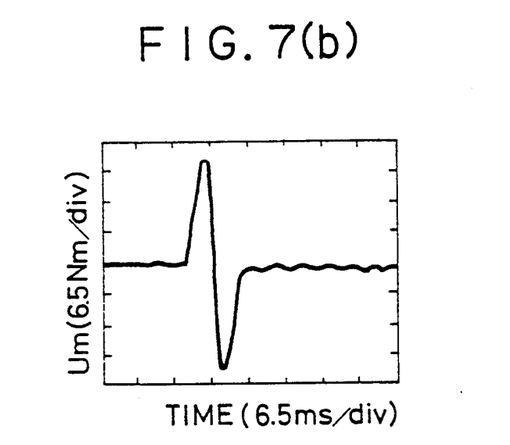
Figure 7C:
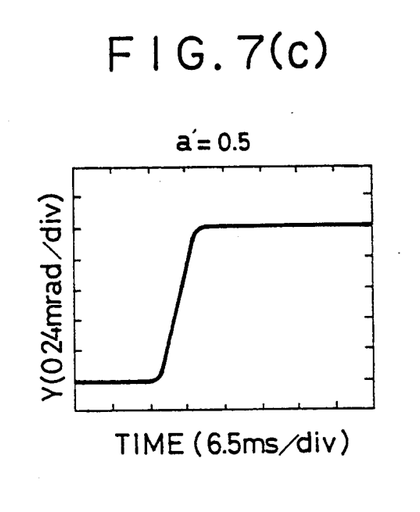
Figure 7D:
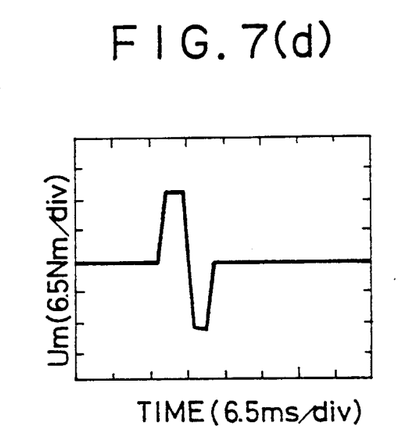

The transfer function of the controlled object (inertia constant I=0.24 kgm$^2$) is shown in FIG. 6. The gain is shown at (a), and the phase at (b). A control system is structured for this controlled object with the crossover frequency 30 Hz, in the manner described above. The positioning with a rising time TO=10 ms, and 1.2 mrad (the rotational angle corresponding to the distance of travel) is performed. The mechanical resonance frequency is 240 Hz as seen from FIG. 6, and it will be seen from FIG. 5 that a' should equal to 0.5 (at point A) to suppress the residual oscillation.

FIG. 7 shows, at (a) and (b), and (c) and (d), the results of the positioning in the case of a'=1.0 and in the case of a'=0.5. As will be seen from the figure, in the case of a'=1.0, the residual oscillation is present in the output signal y. In the case of a'=0.5, no residual oscillation is observed.

Figure 8:
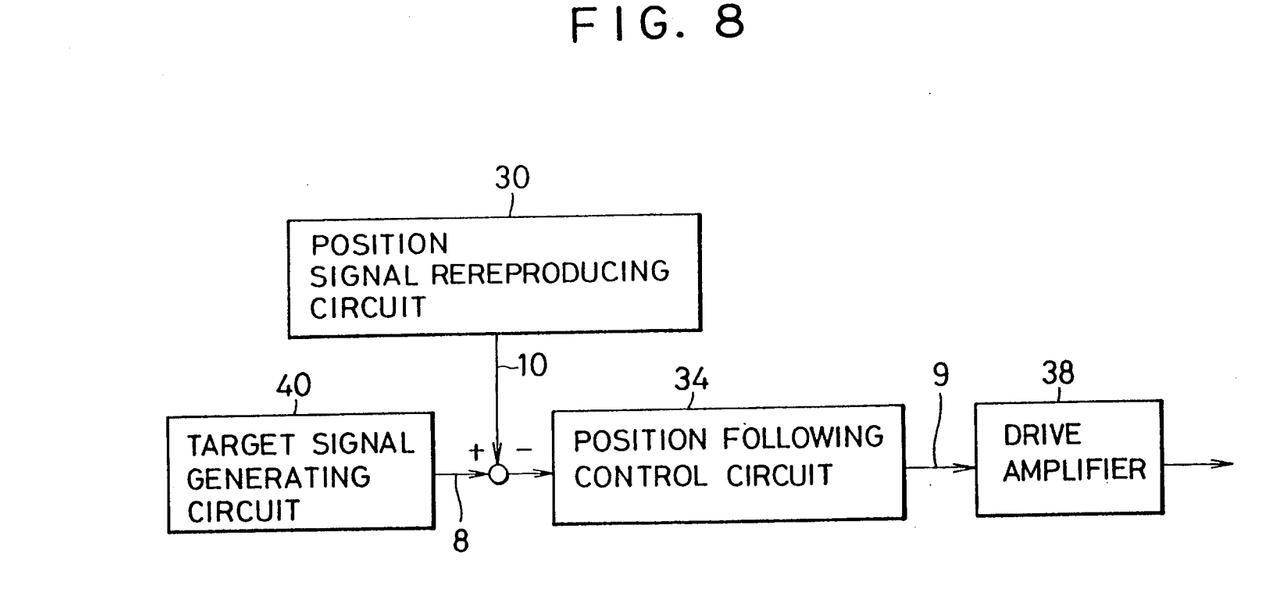
FIG. 8 is a block diagram showing the positioning control apparatus of the embodiment of the invention.

FIG. 8 is a block diagram of the control system of FIG. 1, expressed in the manner of conventional block diagram. A position-following control circuit 34 and a target value signal generating circuit 40 in FIG. 8 are made up, for example, of digital signal processing circuits forming the desired drive signal generating circuit 15, the feedforward compensatory system 13, and the feedback compensatory system 12. The position signal reproducing circuit 30 in FIG. 8 correspond to the position detector 5 in FIG. 1. The drive amplifier 38 in FIG. 8 is part of the controlled object 1 in FIG. 1. The circuit configuration of FIG. 8 is simpler than the conventional circuit configuration shown in FIG. 9.

As has been described, with a simple construction, residual resonance in positioning due to mechanical resonance of the controlled object is suppressed, and a positioning control apparatus with a high speed and a high accuracy can be realized.

The design example is taken to facilitate understanding. The controlled object is assumed to be a motor and a movable member coupled with the motor, but the invention is applicable to any other controlled object.

What is claimed is:

1. A positioning control apparatus comprising:
    a feedback compensatory system comprising:
        detecting means for detecting a position of a controlled object whose position is to be controlled; and
        a compensator, operably connected to and for controlling said controlled object, connected to an output of the detecting means through a comparator;
    a feedforward compensatory system, operably connected to said feedback compensatory system, comprising:
        a first filter means having characteristics reverse to that of the feedback compensatory system; and
        a second filter means having characteristics reverse to that of the object; and
    a desired drive signal generating means supplying the feedforward compensatory system with a desired drive signal having a frequency spectrum having a minimum at the mechanical resonance frequency of the controlled object, wherein said detecting means is operably connected to said controlled object and said first and second filters are operably interconnected.

2. The apparatus of claim 1, wherein said comparator determines the difference between the output of the detecting means and an output of the feedforward compensatory system, said difference determined by said comparator constituting a controlled deviation.

3. The apparatus of claim 1, wherein said first filter and said second filter of said feedforward compensatory means being cascaded with each other.

4. The apparatus of claim 1, wherein said desired drive signal represents desired acceleration.

5. The apparatus of claim 1, wherein said controlled object is an actuator for moving a magnetic head, and said desired drive signal represents desired acceleration during seek operation.

* * * * *